United States Patent
Geburek et al.

(10) Patent No.: US 8,939,427 B2
(45) Date of Patent: Jan. 27, 2015

(54) ARRANGEMENT FOR ADJUSTING A VALVE

(75) Inventors: Frank Geburek, Bad Saldethfurt (DE); Christian Seelmann, Schellerten (DE)

(73) Assignee: Mohlenhoff Warmetechnik GmbH, Salzgitter (DE)

( * ) Notice: Subject to any disclaimer, the term of this patent is extended or adjusted under 35 U.S.C. 154(b) by 1751 days.

(21) Appl. No.: 11/992,456

(22) PCT Filed: Sep. 6, 2006

(86) PCT No.: PCT/EP2006/008659
§ 371 (c)(1),
(2), (4) Date: Mar. 26, 2009

(87) PCT Pub. No.: WO2007/036285
PCT Pub. Date: Apr. 5, 2007

(65) Prior Publication Data
US 2009/0189100 A1    Jul. 30, 2009

(30) Foreign Application Priority Data
Sep. 23, 2005 (DE) .......................... 10 2005 045 432

(51) Int. Cl.
*F16K 31/00* (2006.01)
*F16K 31/02* (2006.01)

(52) U.S. Cl.
CPC .................................... *F16K 31/025* (2013.01)
USPC ......................................................... 251/11

(58) Field of Classification Search
CPC ...... F02G 1/04; G05D 23/30; G05D 23/1921; F16K 31/025
USPC ............. 251/11, 129.04; 236/88, 78 C, 78 D, 236/68 C, 68 R; 60/527; 318/652
See application file for complete search history.

(56) References Cited

U.S. PATENT DOCUMENTS

| 4,156,518 | A  |   | 5/1979  | Ludwig |
|-----------|----|---|---------|--------|
| 4,429,552 | A  | * | 2/1984  | Reedy .............................. 62/528 |
| 5,025,640 | A  | * | 6/1991  | Drucker ....................... 62/324.6 |
| 6,332,757 | B1 | * | 12/2001 | Kaneko et al. ............. 417/222.2 |
| 6,460,335 | B1 | * | 10/2002 | Buschatz ........................ 60/527 |
| 6,840,257 | B2 | * | 1/2005  | Dario et al. ....................... 137/9 |
| 7,959,606 | B2 | * | 6/2011  | Rush et al. .................... 604/152 |

FOREIGN PATENT DOCUMENTS

| DE | 3140472  | 5/1983 |
|----|----------|--------|
| DE | 19810640 | 6/1999 |

(Continued)

*Primary Examiner* — Jason Boeckmann
*Assistant Examiner* — Steven M Cernoch

(57) ABSTRACT

An arrangement is disclosed for adjusting a valve which has a tappet which is under the effect of a restoring spring. In a housing (9) which is to be attached to the valve, a temperature-dependent actuating element (11) which interacts with a working piston (13) is arranged. The actuating element is a metallic component (11) which is composed of an alloy and has an impressed shape memory which extends essentially transversely with respect to the direction of movement of the tappet of the valve. Including the working piston (13) it can be adjusted in the direction of movement of the tappet between two end positions which correspond on the one hand to the open position of the valve and on the other hand to its closed position. The metallic component (11) assumes a shape corresponding to the impressed shape memory when it is heated in its first end position. A pressure unit which acts on the metallic component (11) and by which said metallic component (11) is held in its second end position when the heating stops is mounted in the housing (9).

12 Claims, 2 Drawing Sheets

(56) References Cited

FOREIGN PATENT DOCUMENTS

| | | |
|---|---|---|
| DE | 10220682 | 11/2003 |
| JP | 57025573 | 2/1982 |
| JP | 59103088 | 6/1984 |
| JP | 61017788 | 1/1986 |
| JP | 61017788 A * | 1/1986 ............. F16K 31/70 |
| JP | 61229977 | 10/1986 |
| JP | 02008571 | 1/1990 |

* cited by examiner

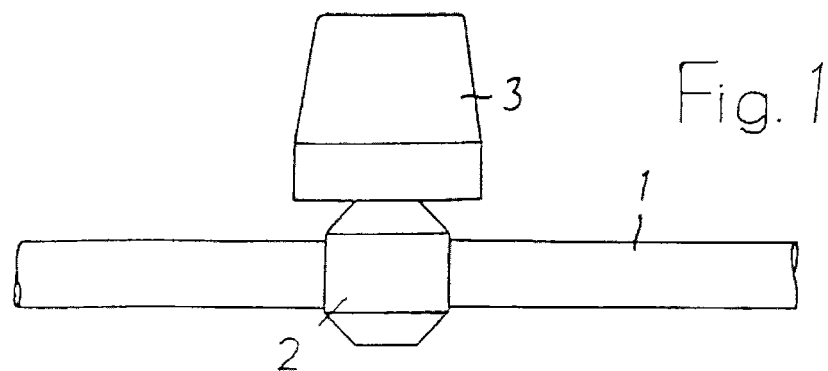
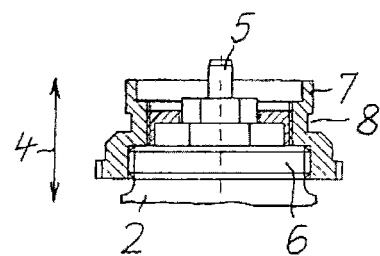
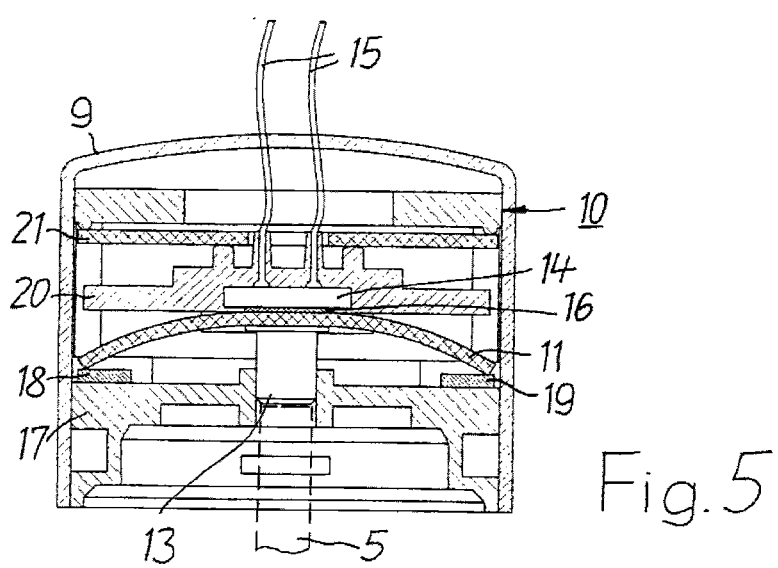

ARRANGEMENT FOR ADJUSTING A VALVE

CROSS REFERENCE TO RELATED APPLICATIONS

This application is the U.S. National Stage of International Application Number PCT/EP2006/008659 filed on Sep. 6, 2006 which was published in English on Apr. 5, 2007 under International Publication Number WO 2007/036285.

TECHNICAL FIELD

The invention relates to an arrangement for adjusting a valve, as is used, for example, in heating and ventilating engineering. It can basically be used wherever an adjusting movement is intended to be performed by a valve. For example, flaps can be moved or clear pipe cross sections altered thereby, so that the flow rate of a medium streaming or flowing through a corresponding pipe system can also be altered. Such a medium is, for example, water or air.

BACKGROUND OF THE INVENTION

The known arrangement according to JP 61229977 A has a linear actuating member having an actuating element consisting of an alloy with impressed shape memory. It is equipped with a moving piston and is connected at both ends to a current source. When current is supplied, the actuating element can be adjusted in the axial direction of the piston by heating and subsequent cooling. For the return movement of the actuating element into its starting position, a cylindrical spring is attached to the same.

In the arrangement which is known through DE 31 40 472 C2, the working piston of a temperature-dependent expansion body and hence also the tappet of a valve are moved by the effect of electric current. An expansion body of this kind comprises a hermetically sealed metallic pot, in which there is disposed a material which changes its volume in dependence on the temperature. The working piston projects into this material with maintenance of the hermetically sealed closure, which working piston, upon heating, is forced out of the pot and, upon cooling, is forced back into the same by a counterforce. Attached to the pot of the temperature-dependent expansion body is, in this arrangement, an electrical resistance as the heating element. A signal delivered, for example, by a thermostat causes the resistance to be supplied with current. As a result of the heat which is then generated, the working piston of the expansion body is adjusted. The tappet of the valve, which valve, for example, in the rest position is closed, is thereby relieved of load and moved by a restoring spring in the "valve opening" direction. Correspondingly constructed arrangements generally work satisfactorily. Because of the relatively large axial length of the expansion body, they often, however, have disturbingly large dimensions. The expansion body is, moreover, a complex and therefore expensive structural part.

SUMMARY OF THE INVENTION

The object of the invention is to design the valve-adjusting arrangement such that its dimensions can be easily reduced.

This object is achieved by an arrangement for adjusting a valve having a tappet which is under the effect of a restoring spring, in which in a housing to be attached to the valve there is disposed a temperature-dependent actuating element, cooperating with an axially adjustable working piston and extending essentially transversely to the motional direction of the working piston, in which, in the assembly position of the housing, the working piston bears against the end face of the tappet of the valve, in which the actuating element is a metallic structural part, consisting of an alloy with impressed shape memory and extending essentially transversely to the motional direction of the working piston, in which the metallic structural part, when heated in a first end position, assumes a shape corresponding to the impressed shape memory, in which in the housing there is fitted a pressure unit, which acts upon the metallic structural part and by which the same is held in a second end position when the heating stops, in which the actuating element, inclusive of the working piston, is adjustable in its motional direction between the two end positions corresponding to the open position of the valve, on the one hand, and its closed position, on the other hand, and in which between the actuating element and the pressure unit there is disposed a spring plate made of mechanically stable plastic, in which, on the side facing the actuating element, an electric heating element (14) is integrated.

The metallic structural part used in this arrangement comprises a shape memory alloy which is known per se, such as is known, for example, from DE 198 10 640 C2. It has, for example, the components nickel, titanium and copper. With special treatment below a critical temperature, a structural part consisting of such an alloy gets with permanent deformation a shape memory impressed, with the proviso that, following deformation out of its impressed shape into another shape, it reverts, upon heating, to the impressed shape, to be precise with considerable force development. Such structural parts can here react at different temperatures, to be precise in dependence on the alloy components used for their construction.

Such a structural part is, in this arrangement, disposed in such a way in the housing of the same that its basic dimensions extend transversely to the motional direction of the tappet. To this end, it can be configured, for example, as a rectangular strip, comparable with a leaf spring. The structural part hence contributes only little to the axial overall height of the housing and thus to the arrangement as a whole. Since the distance spanned by the metallic structural part between its two end positions is relatively small, only a small amount of space is likewise required for the adjustment travel. The dimensions of the arrangement, in particular its height, can therefore be substantially reduced in total relative to known arrangements. As a result of the spring plate with integrated heating element, for example a PTC resistor, which spring plate is fitted between the actuating element and the pressure unit, the energy requirement for the operation of the arrangement can be kept low. This can also mean that a reaction takes place only at a temperature of more than 70° C., which, because of the high temperatures prevailing in heating systems, is advantageous. The alloyed composition of the actuating element is here given in accordance with the aforementioned DE 198 10 640 C2.

BRIEF DESCRIPTION OF THE DRAWINGS

Illustrative embodiments of the subject matter of the invention are represented in the drawings, wherein:

FIG. 1 shows in diagrammatic representation an arrangement according to the invention which is fastened to a valve, FIG. 2 shows a holder mounted on a valve, FIG. 5 shows an embodiment of the arrangement which is modified with respect to FIG. 4.

DETAILED DESCRIPTION

Figure 3:
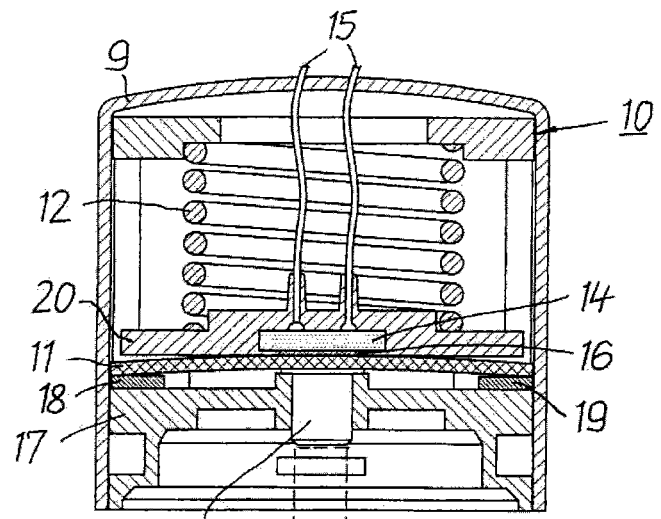
FIGS. 3 and 4 show sections through an arrangement according to FIG. 1 in two different positions in enlarged representation.

According to FIG. 1, a valve 2 is disposed in a conduit 1 in which, for example, heating water is conducted. Attached to the valve 2 is an arrangement 3, with which the position of the valve 2 can be controlled in dependence on the temperature. According to FIG. 2, the valve 2 has a tappet 5, which is pressurized in the direction of the double arrow 4 by a restoring spring (not represented) and is adjustable between two end positions. Concentric to the tappet 5, a threaded connecting socket 6 can be fitted, on which a plastics holder 7 is here screwed. On its circumferential surface, it has in a preferred embodiment, a circumferential, grooved recess 8, in which, in the assembly position, snap-in locking elements of the arrangement 3 can engage. The arrangement 3 can also, however, be fastened differently to the valve 2.

Figure 4:
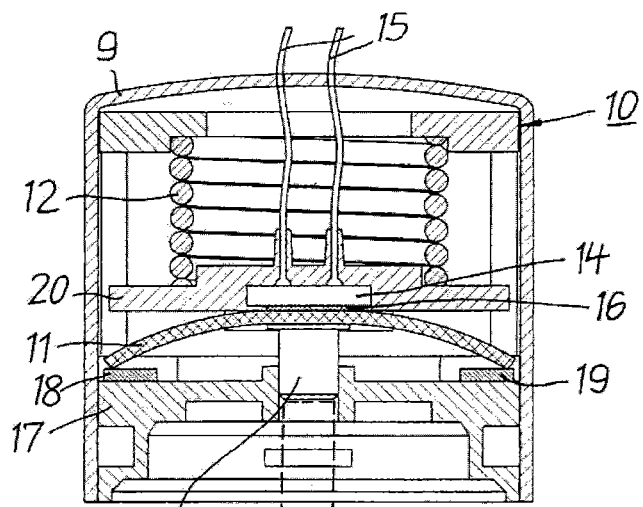

According to FIGS. 3 to 5, the arrangement for adjusting the valve 2 has a housing 9, preferably consisting of a stable plastic, which can be mounted as described onto the valve 2. In the housing 9 there is disposed an insert 10 having a metallic structural part 11 as the actuating element and a compression spring 12 as the pressure unit. The compression spring 12 is represented in FIGS. 3 and 4 as a cylindrical spring. It can also be realized as a conical spring. As the pressure unit, any other element with which sufficient pressure can be applied to the structural part 11 may also, however, be used. This can also be, for example, according to FIG. 5, another metallic element with impressed shape memory.

The structural part 11 extends essentially, transversely to the motional direction of the tappet 5 of the valve 2. It can advantageously be configured as a rectangular strip, comparable with a leaf spring. The structural part 11 thus requires—apart from a space required for its yet to be described movement—only a small amount of space within the insert 10, so that it contributes only little to the overall height of the total arrangement. According to FIGS. 3 to 5, to the structural part 11 there is attached a working piston 13, which is adjustable by the same in its axial direction. On the opposite side of the structural part 11 there is an electrical resistance 14, preferably a PTC resistor, which serves as a heating element and can be connected by a supply line 15 to a current or voltage source. Between the structural part 11 and the resistance 14 can be fitted, for example, a heat-conducting interlay 16, made of insulating material, which is known from DE 102 20 682 A1.

The insert 10 also includes a basic element 17 for mounting of the housing 9 onto the valve 2, in which the working piston 13 is guided and on which the structural part 11 is supported. In the represented illustrative embodiment, it lies with its ends on two plastics slide blocks 18 and 19, which bear against the basic element 17 and can slide on the same. The compression spring 12 bears, on the one hand, against the actual insert 10 and, on the other hand, against a spring plate 20, which is guided displaceably in the insert 10 in the direction of the axis of the compression spring 12 and itself bears against the structural part 11. The spring plate 20 consists of a mechanically stable plastic, such as, for example, polyphenyl sulphonate. The resistance 14 is integrated, in particular in a moisture-tight manner, in the spring plate 20.

The arrangement according to the invention in the embodiment of FIGS. 3 and 4 works, for example, as follows:

The arrangement comprising housing 9 and contents is mounted onto a valve 2, which, in the position of the arrangement according to FIG. 3, is closed. The structural part 11 has here been forced downward by the compression spring 12 by means of the spring plate 20. The structural part 11 has here taken with it the working piston 13, by which the tappet 5 of the valve 2 (FIG. 2) has been brought into the closed position. The spring force of the compression spring 12 must therefore be greater than the spring force of the restoring spring of the valve 2 plus the force necessary for the deformation of the structural part 11. In this position, the resistance 14 generates no heat.

For the opening of the valve 2, the resistance 14 is connected up to a current or voltage source and is thereby heated. The heat emitted by the resistance 14 heats up the structural part 11, which thereupon reverts to its impressed memory shape evident from FIG. 4. It hereupon develops sufficient force to overcome the spring force of the compression spring 12 and compress this. The movement of the structural part 11 is supported by the equidirectionally working restoring spring of the valve 2, the tappet 5 of which presses against the working piston 13. When the valve 2 is to be closed again, the current supply needs only to be broken at the resistance 14. The compression spring 12 forces the structural part 11, inclusive of the working piston 13, then back into its position evident from FIG. 3.

The same working method as for the arrangement according to FIGS. 3 and 4 applies to the arrangement according to FIG. 5, in which the compression spring 12 is replaced as the pressure unit by a metallic element 21, which, just like the structural part 11, has an impressed shape memory. FIG. 5 shows the arrangement with the valve 2 open, analogously to FIG. 4. When the heating of the structural part 11 is switched off, then, in this embodiment of the arrangement, the element 21 forces the structural part 11 with the working piston 13 into the closed position of the valve 2. The components of the alloy of the element 21 are here arranged such that the same, already at a substantially low temperature relative to the structural part 11, reverts to its bent shape corresponding to the impressed shape memory.

As already mentioned, the structural part 11 extends essentially transversely to the motional direction of the tappet 5 of the valve 2. To this effect, apart from the described rectangular strip shape, it can also have any other sensible geometric form. The tappet 5 of the valve 2 needs to be moved only by a short distance of maximally 4 mm between its closed position according to FIG. 3 and its open position according to FIG. 4. This lift travel can basically be directly spanned by the structural part 11. If the same, however, is intended to cover a shorter distance between its two end positions, then mechanical translations which are known per se can be provided, to extend the distance between the structural part 11 and the spring plate 20.

What is claimed is:

1. An arrangement for adjusting a valve having a tappet which is under the effect of a restoring spring, comprising:
   a housing to be attached to the valve;
   a pressure unit fitted in the housing;
   an axially adjustable working piston bearing against an end face of the tappet of the valve:
   a temperature-dependent actuating element disposed in the housing cooperating with the working piston and extending essentially transversely to the motional direction of the working piston, wherein the actuating element is a metallic structural part of an alloy with impressed shape memory configured as a rectangular strip extending essentially transversely to the motional direction of the working piston;
   a spring plate configured for motion in the direction of the axis of the pressure unit and made of mechanically stable plastic positioned between the actuating element and a first end of the pressure unit; and an electric heating element integrated in said spring late on a side of the spring plate facing the actuating element and in between the actuating element and the first end of the pressure unit;

wherein the metallic structural part, when heated in a first end position, assumes a shape corresponding to the impressed shape memory, wherein the first end of the pressure unit acts upon the metallic structural part and holds the metallic structural part in a second end position when metallic structural part is not heated, and wherein the actuating element, inclusive of the working piston, is adjustable in its motional direction between the first and second end positions corresponding to an open position of the valve, and a closed position of the valve, respectively.

2. The arrangement according to claim 1, wherein the heating element is fitted in a moisture-tight manner in the spring plate.

3. The arrangement according to claim 2, wherein the pressure unit is a cylindrical spring or a conical spring.

4. The arrangement according to claim 2, wherein the pressure unit is a metallic element with impressed shape memory, which at lower temperatures reacts to the actuating element.

5. The arrangement according to claim 1, wherein the pressure unit is a cylindrical spring or a conical spring.

6. The arrangement according to claim 1, wherein the pressure unit is a metallic element with impressed shape memory, which at lower temperatures reacts to the actuating element.

7. The arrangement according to claim 1, wherein the pressure unit, the spring plate and the electric heating element are each positioned on a first side of the actuating element and the valve and the working piston are positioned on a second and opposite side of said actuating element.

8. The arrangement according to claim 1, wherein the spring plate further comprises a flat portion adjacent to said first end of the pressure unit and external to said pressure unit, and wherein said first end of the pressure unit bears against said flat portion.

9. The arrangement according to claim 8, wherein said actuating element is adjacent to said spring plate and external to said pressure unit.

10. The arrangement according to claim 1, further comprising an insert disposed in the housing, said insert comprising the actuating element and said pressure unit.

11. The arrangement according to claim 10, wherein said insert comprises an element configured to mount said housing onto said valve.

12. The arrangement according to claim 10, wherein said pressure unit comprises a second end that is opposite said first end of the pressure unit and configured to bear against a surface of the insert.

* * * * *